（12） United States Patent
Kim et al.

(10) Patent No.: US 8,606,293 B2
(45) Date of Patent: Dec. 10, 2013

(54) MOBILE DEVICE LOCATION ESTIMATION USING ENVIRONMENTAL INFORMATION

(75) Inventors: Taesu Kim, San Diego, CA (US); Kisun You, Suwon (KR); Te-Won Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 12/898,647

(22) Filed: Oct. 5, 2010

(65) Prior Publication Data

US 2012/0083286 A1  Apr. 5, 2012

(51) Int. Cl.
*H04M 3/00* (2006.01)
*H04W 24/00* (2009.01)

(52) U.S. Cl.
USPC ............... 455/456.1; 455/418; 455/456.3; 455/456.5

(58) Field of Classification Search
USPC .......... 455/456.1–456.6, 414, 41.2, 404.2, 455/414.1–414.4, 415–420, 457–459, 463, 455/466, 500, 517, 550.1, 556.2, 561; 342/450; 709/224; 701/446–447, 701/450–454, 482–487, 515–517; 340/539.1–539.17, 7.62, 8.1, 9.1–9.11
See application file for complete search history.

(56) References Cited

U.S. PATENT DOCUMENTS

| | | | |
|---|---|---|---|
| 5,918,223 A | 6/1999 | Blum et al. | |
| 6,127,975 A * | 10/2000 | Maloney | 342/457 |
| 6,912,178 B2 | 6/2005 | Chu et al. | |
| 7,171,329 B2 * | 1/2007 | Rodman et al. | 702/150 |
| 7,617,287 B2 | 11/2009 | Vella et al. | |
| 7,675,414 B2 | 3/2010 | Ray | |
| 7,746,226 B2 | 6/2010 | Cohen et al. | |
| 2001/0022558 A1 * | 9/2001 | Karr et al. | 342/450 |
| 2004/0259536 A1 | 12/2004 | Keskar et al. | |
| 2005/0076081 A1 | 4/2005 | Rui et al. | |

(Continued)

FOREIGN PATENT DOCUMENTS

| | | |
|---|---|---|
| EP | 2317729 | 5/2011 |
| GB | 2445436 A | 7/2008 |
| WO | WO0248837 | 6/2002 |
| WO | WO2010125488 A2 | 11/2010 |

OTHER PUBLICATIONS

Azizyan, Martin, et al., "SurroundSense: Mobile Phone Localization via Ambience Fingerprinting", MobiCom'09, Sep. 20-25, 2009, Beijing, China, 12 pages.
International Search Report and Written Opinion—PCT/US2011/054962—ISA/EPO—Nov. 18, 2011.
Janson, et al., "Self-localization application for iPhone using only ambient sound signals", Dept. of Comput. Sci., Univ. of Freiburg, Freiburg, Germany. This paper appears in: Indoor Positioning and Indoor Navigation (IPIN), 2010 International Conference on Sep. 15-17, 2010, Zurich, 2pages.

(Continued)

*Primary Examiner* — Meless Zewdu
(74) *Attorney, Agent, or Firm* — Heejong Yoo

(57) ABSTRACT

Estimating a location of a mobile device is performed by comparing environmental information, such as environmental sound, associated with the mobile device with that of other devices to determine if the environmental information is similar enough to conclude that the mobile device is in a comparable location as another device. The devices may be in comparable locations in that they are in geographically similar locations (e.g., same store, same street, same city, etc.). The devices may be in comparable locations even though they are located in geographically dissimilar locations because the environmental information of the two locations demonstrates that the devices are in the same perceived location. With knowledge that the devices are in comparable locations, and with knowledge of the location of one of the devices, certain actions, such as targeted advertising, may be taken with respect to another device that is within a comparable location.

48 Claims, 8 Drawing Sheets

(56) References Cited

U.S. PATENT DOCUMENTS

| | | |
|---|---|---|
| 2006/0046707 A1 | 3/2006 | Malamud et al. |
| 2007/0037583 A1 | 2/2007 | Kim et al. |
| 2007/0130580 A1 | 6/2007 | Covell et al. |
| 2007/0172047 A1 | 7/2007 | Coughlan et al. |
| 2008/0147461 A1 | 6/2008 | Lee et al. |
| 2008/0160976 A1 | 7/2008 | Virolainen et al. |
| 2008/0160977 A1* | 7/2008 | Ahmaniemi et al. ......... 455/416 |
| 2008/0187143 A1 | 8/2008 | Mak-Fan |
| 2008/0232568 A1 | 9/2008 | Diethorn |
| 2009/0086949 A1 | 4/2009 | Caspi et al. |
| 2009/0112589 A1 | 4/2009 | Hiselius et al. |
| 2009/0176505 A1 | 7/2009 | Van Deventer et al. |
| 2010/0040217 A1 | 2/2010 | Aberg et al. |
| 2010/0112991 A1 | 5/2010 | Hannaby |
| 2010/0120465 A1 | 5/2010 | Chung |
| 2010/0205174 A1 | 8/2010 | Jiang et al. |
| 2010/0216490 A1* | 8/2010 | Linden ................... 455/456.3 |
| 2010/0316232 A1 | 12/2010 | Acero et al. |
| 2010/0332668 A1 | 12/2010 | Shah et al. |
| 2011/0294515 A1* | 12/2011 | Chen et al. ............ 455/456.1 |
| 2012/0131186 A1* | 5/2012 | Klos et al. ................ 709/224 |
| 2012/0142324 A1 | 6/2012 | Kim et al. |
| 2012/0142378 A1 | 6/2012 | Kim et al. |
| 2012/0224707 A1 | 9/2012 | Kim et al. |

OTHER PUBLICATIONS

Azizyan et al., "SurroundSense: mobile phone localization using ambient sound and light", ACM Sigmobile Mobile Computing and Communications Review, Jan. 1, 2009, pp. 69-72, vol. 13, No. 1, XP002669131, DOI: 10.1145/1558590.1558605.

Azizyan, et al., "SurroundSense: Localizing Mobile Phones Using Ambient Light, Sound, Color, and Motion", Duke University, 15 pages, No date given.

Jain et al., "Data clustering: a review", ACM Computing Surveys, Sep. 1, 1999, pp. 264-323, vol. 31, No. 3, XP002165131, ISSN: 0360-0300, DOI: 10.1145/331499.331504.

Hong Lu et al., "SoundSense: Scalable Sound Sensing for People-Centric Applications on Mobile Phones", MobiSys'09, Jun. 22-25, 2009, Kraków, Poland, pp. 165-178.

Martin Wirz, et al., "A wearable, ambient sound-based approach for infrastructureless fuzzy proximity estimation", In Proceedings of the 14th IEEE International Symposium on Wearable Computers (ISWC 2010). IEEE Computer Society, Oct. 2010.

Written Opinion of the International Preliminary Examining Authority for International Application No. PCT/US2012/025464 mailed Feb. 22, 2013, 5 pages.

* cited by examiner

MOBILE DEVICE LOCATION ESTIMATION USING ENVIRONMENTAL INFORMATION

BACKGROUND

Knowing the location of a mobile device, such as a mobile phone, personal data assistant (PDA), cellular phone, and the like, may be useful because the location of the mobile device typically is the same as the location of the user of the device. With knowledge of the location of a user, for example, emergency personnel may be dispatched to the user in an emergency, or the user can get directions if lost, or advertisements related to the location of the user can be sent to the user's mobile device. For example, if the user is near a coffee shop, an advertisement or message can be sent to the user's device to entice the user into the coffee shop. If the user is having dinner in a restaurant, an advertisement or message for an ice cream stand next door can be sent to the user's device.

There are many methods in the prior art that can be used to locate a mobile device, including the Global Positioning System (GPS), time difference of arrival (TDOA), cell identification (cell ID), enhanced cell ID (E-CID), and angle of arrival (AOA), to name a few. Some location techniques like GPS, however, require hardware and software to be added to the mobile device. Thus, a device that does not include the GPS hardware and software cannot be located using GPS. Other techniques, such as TDOA or AOA, for example, require hardware and software to be added to the cell network at, for example, the cellular antenna, base transceiver stations, base station controllers, etc. But such installations may be expensive. Further, all of these location techniques may lack the accuracy necessary to, for example, send targeted advertisements or messages. For example, if the user is in a shopping mall, the user's mobile device may not be able to receive GPS signals, making it impossible to determine the device's location within the mall. And while TDOA may be used to estimate a device's location within the shopping mall, the accuracy requirements for TDOA may not enable determining whether the phone is closer to a clothing store versus a coffee shop versus a music store. Thus, sending targeted advertisements or messages may be fruitless.

While the foregoing techniques discussed so far estimate locations based on signals that the mobile device sends (e.g., TDOA) or on signals that the mobile device receives (e.g., GPS), another location technique takes advantage of the mobile device's environment to estimate its location. Thus, instead of processing signals sent by the mobile device or sent to the mobile device for the specific purpose of determining its location, these techniques process other information. For example, a mobile device may capture environmental light or movement information through an accelerometer and use that information to determine that the phone is in a disco or a movie theater.

However, the use of environmental information may require surveying potential mobile device locations in advance and storing the environmental information associated with those locations. Further, estimating a mobile device's location based on the vast amount of this environment information data may involve comparing the environmental information perceived by the mobile device with the stored information in an attempt to find similarities or a "match." Such comparison can absorb vast amounts of computer resources and may not be capable of completing a location estimation in a reasonable amount of time.

SUMMARY

A location of a device, such as a first mobile device, may be estimated by comparing the environmental information of the first mobile device with the environmental information of a second mobile device. Through such a comparison, a determination may be made that the first mobile device is in a comparable location as the second mobile device.

In an implementation, using environmental information perceived by the first and second mobile devices, the location of the first device may be determined to be geographically the same as the second mobile device. For example, the two devices are determined to be in the same store, on the same street, in the same town, at the same event (concert, political rally, game), etc. Because the two devices are in the same geographic location, the devices may share the same environmental information or sufficiently similar environmental information to determine the comparability of the locations of the two devices.

In an implementation, using environmental information perceived by the first and second mobile devices, the first device may be determined to be within a perceived distance or within a perceived proximity of a second mobile device. For example, the two devices each may perceive the same or sufficiently similar environmental information and therefore be within a perceived distance or proximity of one another. The devices may be in the same room or one device may be in a room and the other just outside the door of the room. Because the devices may perceive similar environmental sound information, the two devices may be within a perceived distance or in a perceived proximity of one another.

In an implementation, using environmental information perceived by the first and second mobile devices, the location of the first device may be determined to be similar to the location of the second device. For example, the two devices each may be in the same type of store but the two stores may be geographically different (e.g., separated) from one another. The two stores may be, for example, a part of the same franchise and therefore may have similar environmental information because they may include similar furnishings, orientation, music, vocabulary, machinery, lighting, products, size, etc. Thus, through environmental information, the two devices may be determined to be in comparable locations even though the first device may be in northeastern United States or in Manhattan's Upper East Side and the second device in the southwestern United States or Manhattan's West Village, for example.

In an implementation, targeted advertising, messages, or other data, for example, related to the locations of both devices, may be sent to one or both of the devices even though the geographic location of either or both mobile devices may remain unknown. The advertisement or message may promote the store, retailer, franchise, or a product sold, for example. Alternatively, information related to encouraging the user of a mobile device to leave a comparable location and instead go somewhere else may be sent to the phone. For example, a store that competes with the location may send information, informing the user about the competing store or providing the user with an incentive (e.g., a coupon) to leave the current location and go to an alternate location.

In an implementation, a geographic location of the second mobile device may be known and therefore, a determination, based on a comparison of the environmental information of both devices, results not only in a determination that the two are in environmentally comparable locations but also a determination of the location of the second mobile device. For example, the second mobile device may provide its geographic location based on, for example, GPS. The location of the first mobile device thus may be determined to be the same or similar to the location of the second mobile device through comparison of environmental information. In this way, knowledge of the geographic location of the second device may result in knowledge of the geographic location of the first device because, for example, they are collocated or may result in knowledge that the first device is within a perceived distance or perceived proximity of the second device. That is, the first and second devices may be determined to be in the same store, restaurant, or club, at the same rally, at the same fireworks show, on the same street, at the same event, etc. Alternatively, the location of the first device may be determined to be comparable to that of the second device even though the two devices are geographically separated. For example, the second device may indicate that its geographic location is within a particular store, and the first device is determined to be in the same type of store (e.g., a comparable location), though the two stores are geographically separated from one another.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
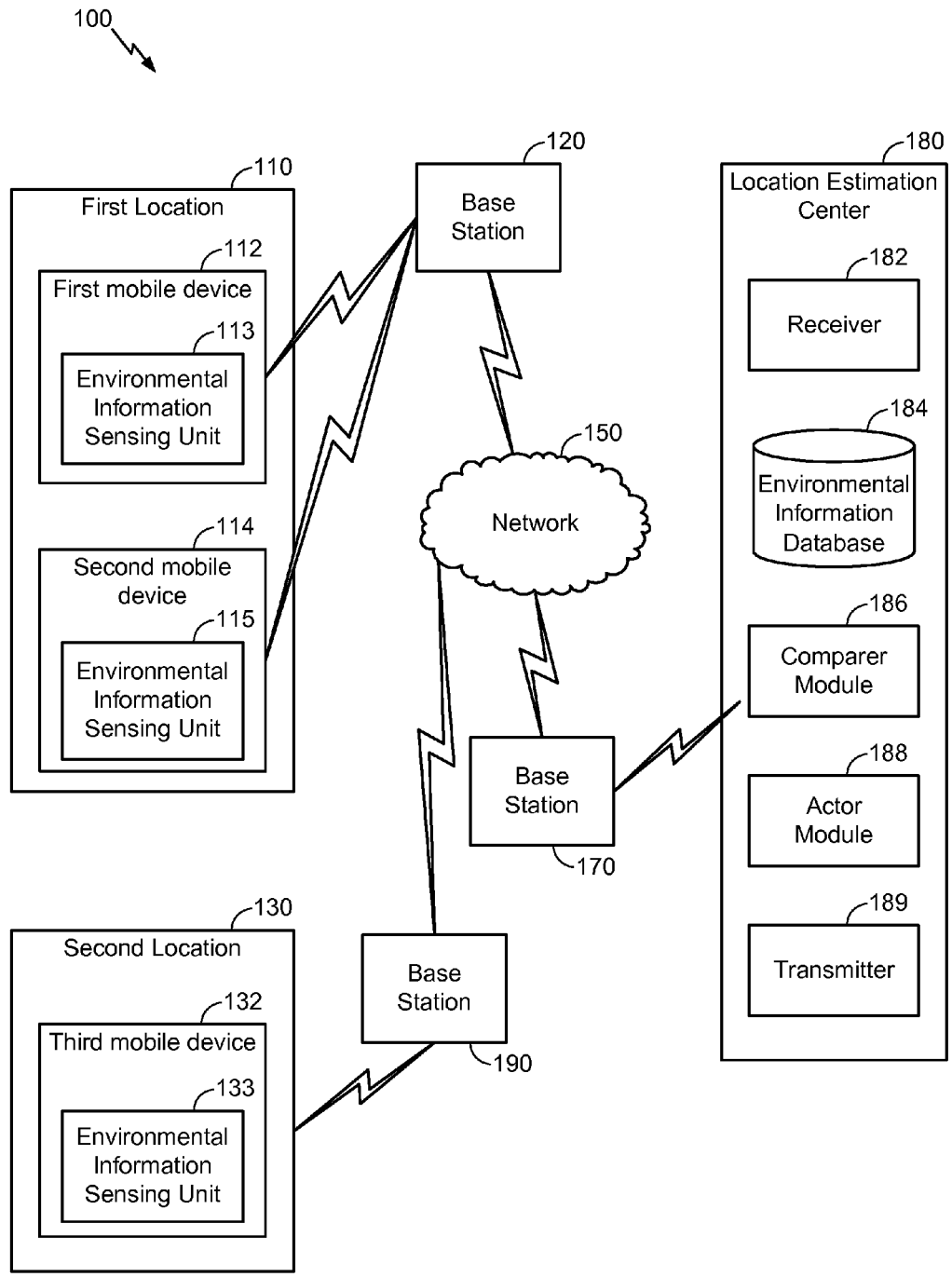
FIG. 1 is an illustration of an example environment for providing location estimation using environmental sound.

FIG. 1 is an illustration of an example environment 100 for estimating mobile device locations using environmental information such as environmental sound. The environment 100 may include a first mobile device 112 to be located as well as second and third mobile devices 114, 132 that may additionally be located. Each of the mobile devices 112, 114, 132 may include one or more respective environmental sensing units 113, 115, 133. Each of the environmental information sensing units 113, 115, 133 may include, for example, one or more of microphones or other sound sensors, cameras, accelerometers or other motion sensors, color sensors, light sensors, thermometers, barometers, altimeters or other pressure sensors, or any other type of sensor such as any sensor used to measure, record, or otherwise convey any aspect of the environment of the respective devices 112, 114, 132. Such units 113, 115, 133 may use software and/or hardware of the devices 112, 114, 132 that may not be necessary for typical operation of the devices 112, 114. On the other hand, the invention may take advantage of sensors already used in the daily operation of the devices 112, 114, 132 such as, for example, microphones used to convey a user's voice during a telephone call. That is, some embodiments of the present invention may be practiced without requiring any modification of mobile devices 112, 114, 132.

Each of the mobile devices 112, 114, 132 may be operational in any type of network, as well as any combination of networks, including cellular networks, circuit switching networks, public switching networks, local area networks, wide area networks, wireless networks, and/or packet switching networks, etc. In the example environment 100 of FIG. 1, the first and second mobile devices 112, 114 may be substantially near one another geographically such that they are both in the same cell as a base station 120 or at least are both in communication with the base station 120. Of course, in alternative embodiments, the first and second mobile devices 112, 114 may be substantially near one another geographically and yet be in communication with different base stations.

Thus, use of the phrase "geographically similar" means that devices, such as first and second mobile devices 112, 114, are generally in the geographic vicinity of one another. For example, the devices may be exactly at the same latitude or longitude. But the phrase "geographically similar" is broader. The phrase encompasses circumstances when the first device 112 would be considered to be geographically near the second device 114. Thus, the extent of the phrase "geographically similar" depends on context and/or implementation. For example, if the two devices 112, 114 are in the same store, the geographic location of the two devices may be "geographically similar" if the invention is intended to be implemented as such. Likewise, the devices may be "geographically similar" if the first mobile device 112 is located in a first store and the second mobile device 114 is located in a second store that is adjacent or near the first store, again, if the invention is intended to be implemented as such.

In other circumstances, the invention may be implemented such that the geographic locations of the devices 112, 114 in adjacent stores may result in a determination that the locations are not geographically similar. Thus, the devices 112, 114 may be in locations that are geographically similar if, depending on the particular implementation, they are in the same store, in adjacent stores, in the same shopping mall, on the same street, in the same arena, park, stadium, or hotel, in the same city, etc. Whether the locations are considered "geographically similar" depends on the implementation but the phrase herein conveys the meaning that the locations are physically within some implementation-defined or predetermined proximity of one another. On the other hand, and again depending on implementation, the locations may be determined to be geographically dissimilar if the devices 112, 114 are located in the same store, in adjacent stores, in the same shopping mall, on the same street, in the same arena, park, stadium, or hotel, in the same city, etc. In the event that the mobile devices 112, 114 are determined to be in locations that are geographically similar, the respective locations may be considered comparable. That is, in such a circumstance, the geographic location of the mobile device 112 may be comparable to that of mobile device 114.

Additionally, the location of the mobile device 112 may be comparable to that of the mobile device 114 if the two devices are perceptually close, i.e. within a perceptual distance of each other or are in perceptual proximity to one another in terms of human perception (e.g., as determined by a server, a location estimation center, or other computing device or system). For example, the mobile device 112 may be located in a store and the mobile device 114 may also be located in that store. Because both phones may have similar perceptions of the environmental information, they may be considered, in implementations, to be perceptually proximate to one another. Thus their locations may be considered comparable. Also, if the mobile device 112 is in the store and the mobile device 114 is outside the store but, for example, if the door of the store is open, the two devices may also perceive similar environmental information such as surrounding sound and thus be considered within a perceptual distance of one another or within perceptual proximity of one another (i.e., perceptually close, as a human would perceive the sounds, as determined by a server, location estimation center, or other computing device or system, for example). Thus, in this case, and depending on implementation, the locations may be comparable. However, if the door to the store is closed, for example, then the environmental sound of the two devices may be sufficiently different to conclude that, even though the two devices may be geographically near one another, they may not be within a perceptual distance of one another or may not be within a perceptual proximity of one another (i.e., not perceptually close, as a human would perceive the sounds). In such circumstances, and again depending on implementations, the locations of the phones may be considered incomparable. Moreover, if the first mobile device 112 is involved in a phone call with the second mobile 114, then the two devices 112, 114 may be perceiving similar environmental information and thus be considered perceptually close, within a perceptual distance of one another, or within a perceptual proximity even though they may be geographically vastly separated. In this circumstance, the two devices 112, 114 may be considered in a comparable location.

Furthermore, in the event that the respective locations are determined to be geographically dissimilar, however, in implementations, the respective locations may be still be considered comparable. That is, the geographic locations may be dissimilar and yet the respective locations of the devices 112, 114 may be comparable, depending on the particular implementation. For example, the first mobile device 112 may be geographically located inside a store of a franchise located in one place, such as midtown Manhattan or the northeastern United States. The second mobile device 114 may be geographically located in a second store of the same franchise that is in the West Village of Manhattan or in the southwestern United States. Because the stores in the same franchise may have similar environments, however, the two stores—despite any perceived geographic dissimilarity—may be comparable within the meaning of the invention. For example, the stores may have similar orientations of design and/or have similar furnishings, music, other ambient sound, temperature, etc., and/or perform or provide similar services and use similar machinery, vocabulary, lighting, etc.

For whatever reason and depending on the implementation, because of the similarities in environment, the location of the two stores may be considered to be "comparable" to one another. Thus, the locations of the first and second mobile devices 112, 114 may be in different stores, different cities, different states, and/or even different countries, and thus may be considered, in the implementation design of the invention, geographically dissimilar, and yet the implementation may consider the two locations comparable. Of course, the two comparable locations need not be part of the same franchise to be encompassed by the invention. The two comparable locations could be entirely distinct from one another but may share similarities in environment and thus may be comparable in the implementation. For example, diners, movie theaters or sporting arenas may share enough environmental similarities, depending on implementations of the invention, to be considered comparable within the meaning of the claims. Thus, one device located at one diner or movie theater or sporting event, etc., may be determined to be in a comparable location as another device even though the two devices are not located in the same diner or movie theater or sporting event, etc.

Referring again to the example environment 100 of FIG. 1, the first mobile device 112 and the second mobile device 114 may both be in a first location 110. Thus, the first and second mobile devices 114 may be in a geographically similar location 110 or in otherwise comparable locations based on similarities in respective location environments. The third mobile device 132 depicted in the environment 100, on the other hand, may be in a second location 130 that may be geographically dissimilar from the location 110. On the other hand, and again depending on implementation, the third device 132 may be geographically located with the first and second devices 112, 114 (e.g., in the same mall or in the same store) and yet may be in incomparable locations because of differences in environment—again, it depends on the implementation.

Each of the mobile devices 112, 114, and 132 may use their environmental information sensing units 113, 115, 133 to sense environmental information of the respective locations 110, 130. Thus, for example, a microphone included with the first and second mobile devices 112, 114 may sense the same or similar environmental sound information emanating within the first location 110. And while the third mobile device 132 may likewise include a microphone to sense the environmental sound information in the second location 130, this environmental sound information may be sufficiently different from that sensed by the first and second mobile devices 112, 114 to conclude that the third mobile device 132 is not in a location comparable to the first location 110.

The mobile devices 112, 114 may both be in communication with the base station 120 or may, of course and as stated previously, be in communication with different base stations. The base station 120 may communicate with a network 150 which may generally include any other portions of cellular, packet switching, circuit switching, public switched telephone network (PSTN), etc., networks used to enable the first and second mobile devices 112, 114 to communicate with other mobile or fixed devices, computers, servers, etc., located anywhere. The network 150, for example, may then communicate with a base station 170 that may be in communication with a location estimation center 180. Of course, the location estimation center 180 may, instead of communicating with a base station 170, be a node on a wired or wireless portion of the network 150, such as a server or client on the Internet.

The third mobile device 132 may communicate with the network 150 through base station 190. Thus, through the network 150, the third mobile device 132 may be in communication with the location estimation center 180. Even though the third mobile device 132 communicates with base station 190 instead of base station 120, it may still be in the same or similar geographic location as that of the first and second mobile devices 112, 114.

The location estimation center 180 may be any entity within or outside of network 150 that estimates the location of devices, such as the mobile devices 112, 114, 132, by, at least, comparing the environmental information received from the devices 112, 114, 132. The location estimation center 180 may include one or more receivers, such as the receiver 182 for receiving environmental information from the mobile devices 112, 114, 132. The receiver may be adapted to receive radio-frequency information or may be any other device or technology that first obtains environmental information sent by the mobile devices 112, 114, 132.

The location estimation center 180 may include an environmental information database 184. The environmental information database 184 may include environmental information associated with prospective device locations as well as with locations 110, 130. Thus, the database 184 may include one or more of sound, light, motion, tactile, temperature, barometric, color, etc., information associated with the prospective locations and the locations 110, 130. The database 184 may be populated with such environmental information by "fingerprinting" the locations through any method prior to performing any location estimations, in an implementation. On the other hand, the database 184 may be populated on the fly by receiving environmental information from devices such as mobile devices 112, 114, 132. In addition to including environmental information associated with various locations, the database 184 additionally may include, in alternative embodiments, the geographic location of one or more of the various locations. Such geographic location information may be recorded by latitude and longitude or by a mailing address or part of a mailing address, as explained further herein.

The location estimation center 180 may also include a comparer module 186. The comparer module 186 may retrieve information from the environmental information database 184 and perform operations to determine if environmental information perceived by a mobile device such as the first mobile device 112 is similar to the environmental information stored in the environmental information database 186. The extent of the required similarity, of course, depends on implementation. However, when a similarity is determined, then the location associated with the environmental information stored in the database may be estimated to be comparable to the location of the first mobile device 112.

Alternatively or additionally, the comparer module 186 may compare environmental information received from, for example, the first mobile device 112 with environmental information received from, for example, the second mobile device 114 and/or the third mobile device 132. In such an embodiment, the comparer module 186 may determine whether any of the environmental information received from the first mobile device 112 is comparable (e.g., similar)— within the implementation parameters—to environmental information received from the second and/or third mobile devices 114, 132. Thus, the comparer module 186 may determine that the first and second mobile devices 112, 114 are in a comparable location, for example.

Further, the comparer module 186 may refer to the information stored in the environmental information database 184 and determine that the mobile devices 112, 114 are perceiving environmental information comparable to the first location 110. Further, the comparer module 186 may determine the geographic location of the mobile devices 112, 114 by reference to the environmental information database 184 and the geographic location of any comparable location. The comparer module 186 further may determine that the first and second mobile devices 112, 114 at the first location 110 are in a comparable location to the third mobile device 132 in the second location 130. Thus, while the second location 130 may be determined to be, in an implementation, geographically dissimilar to the first location 110, the second location 130 may be comparable to the first location 110 based on environmental information provided by the first and/or second mobile devices 112, 114 (or retrieved from the environmental information database 184), as compared to the environmental information by the third mobile device 132.

The location estimation center 180 may also include an actor module 188. The actor module 188 may determine an action to be taken upon estimating a location of a mobile device, such as the mobile devices 112, 114, 132. The actor module 188 may be or include a server computer or may be or include a client computer. Alternatively or additionally, the actor module 188 may be or include a device such as a mobile device. In an implementation, the actor module 188 may respond to any entity requesting location information and provide any requested location information. In another implementation, the actor module 188 may, upon determining the location of the first mobile device 112, for example, send the first mobile device 112 an advertisement, message, or other data associated with the first location 110. Such an advertisement may be sent by a server computer or may be sent by a client computer or another device, such as a mobile device, as a message. Such advertisement, message, or other data may be intended to entice the first mobile device 112 to become a patron of a store at or near the first location 110. Or such an advertisement or other data may, in alternative embodiments, be intended to entice a user of the first mobile device 112 to leave the first location 110 and become a patron of a competitor to an entity at the first location 110.

In alternative embodiments, the actor module 188 may send a located device such as the mobile devices 112, 114, 132 information attempting to dissuade the users of one or more of the devices 112, 114, 132 from remaining at the first or second locations 110, 130 for any reason. Depending on the implementation, the advertisement, message, data, or other information described herein may be sent to the mobile device(s) via email, text messaging, instant messaging, web chat, phone, facsimile, a website, mail, facsimile, etc.

In alternative embodiments, the actor module 188 may receive data from one or more devices 112, 114, 132. Such data may include a message, data, or communication to be sent to another one of the mobile devices 112, 114, 132 or may be for sending to another device, server, or entity.

In still further embodiments, for example, the actor module 188 may be used to enhance social networking. For example, if the comparer module 186 estimates that one or more of the mobile devices 112, 114, 132 are in comparable locations (e.g., locations that are geographically similar or otherwise similar based on environmental location information), then the actor module 188 may determine, based on reference to social networking information, that the users of one or more of the mobile devices 112, 114, 132 may know each other or may otherwise have something in common (e.g., know the same people, be interested in the same things, etc.). Armed with this information, the actor module 188 may send information associated with one of the mobile devices 112, 114, 132 to one of the other devices 112, 114, 132. Such information may be, for example, an identification of the user of the devices 112, 114, 132 or related to interests of the users of the devices 112, 114, 132.

Moreover, the actor module 188 or one of the client devices 112, 114, 132, upon learning that they are within a comparable location of another of the client devices 112, 114, 132 may initiate or facilitate a peer-to-peer (P2P) session and/or application or a machine-to-machine (M2M) session and/or application.

Thus, overall and in general, the actor module 188 may be an entity that determines any action to be taken based on whatever location information is determined or estimated by the comparer module 186.

The location estimation center 180 may further include a transmitter 189 that is responsible for sending any action determined by the actor module 188 to the intended recipient of the action. For example, the transmitter 189 may send to the first mobile device 112 an advertisement or a coupon associated with the first location 110. Or the transmitter 189 may send the first mobile device 112 information intended to persuade the user of the first mobile device 112 to leave the first location 110. The transmitter 189 may also send location estimation information received from the comparer module 186 to any entity requesting the information. Or the transmitter 189 may send social network information, such as information associated with one of the mobile devices 112, 114, 132 (e.g., the identity of a user of the devices 112, 114, 132).

Figure 2:
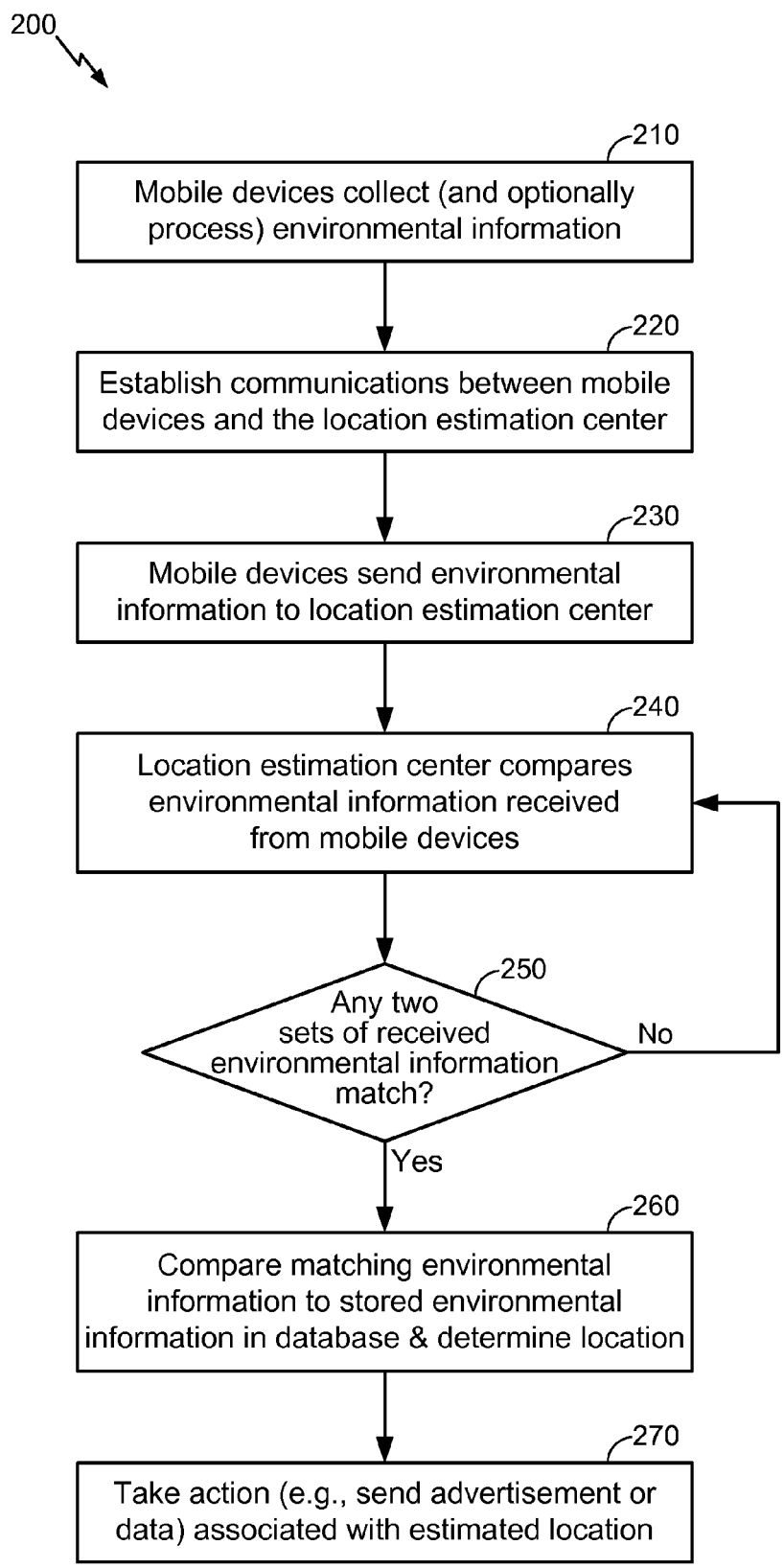
FIG. 2 is an operational flow of an implementation of a method for providing location estimation using environmental sound.

FIG. 2 is an operational flow of an implementation of a method 200 for providing location estimation using environmental sound information. The method 200 may commence at 210, for example, when mobile devices, such as mobile devices 112, 114, 132 of FIG. 1, begin collecting environmental information. The mobile devices, at 220, may establish communications with the location estimation center (if not already established) to send the environmental information. At 230, the mobile devices may send to the location estimation center environmental information, such as that discussed with respect to FIG. 1. In an implementation, the mobile devices may process the collected environmental information and send the processed environmental information to the location estimation center for further processing as described herein.

The location estimation center, at 240, may compare environmental information received from mobile devices such as devices 112, 114, 132. If, at 250, the location estimation center determines that the received environmental information from two or more mobile devices is similar enough, depending again on the implementation, to be considered a location "match," then at 260, the matching environmental information may be compared to environmental information stored in a database and a geographic location, or an otherwise comparable location, may be determined. If, at 250, no two sets of received environmental information from mobile devices is found to be similar enough to be considered a "match" (e.g., comparable), then the location estimation center continues to compare environmental information received from mobile devices in search of a "match."

With reference again to 250, a "match" in environmental information rests on the level of similarity or comparability used in the implementation. Thus a match in one implementation may be different from a match in another. With reference again to 260, the comparison of the environmental information from the mobile devices to that stored in the environmental information database likewise depends on implementation. That is, the extent of similarity or comparability between the various environmental information to be considered a match depends on implementation. Also, the "location" determined at 260 may be the geographic location of the devices and/or may instead be locations that are comparable in terms of the respective environments but may be geographically dissimilar, as discussed herein. In fact, the determined locations may not even include a determination of geographic location of any of the mobile devices. They may merely include an indication that one mobile device is in a comparable location of another mobile device.

After 260 estimates a comparable location, then at 270, an action is taken that is associated with the estimated location. For example, a response may be sent to any entity requesting location information and may provide any requested location information. In another implementation, 270 may include, upon determining the location of a mobile device, for example, sending an advertisement, message, or other data associated with the estimated location. Such advertisement, message, or other data may be intended to entice the user of the mobile device to become a patron of a store at or near the location. Or such an advertisement, message, or other data may, in alternative embodiments, be intended to entice a user of the mobile device to leave the location and become a patron of a competitor to an entity at the location. In alternative embodiments, 270 may comprise sending to the located mobile device information that may tend to dissuade the user of the device from remaining at the location for any reason.

In alternative embodiments, the action may be receiving data from one or more devices 112, 114, 132. Such data may include a message, data, or communication to be sent to another one of the mobile devices 112, 114, 132 or may be for sending to another device, server, or entity. Thus, an action may include sending the message, data, or communications as requested.

In still further embodiments, for example, 270 may be used to enhance social networking. For example, if the implementation results in an estimate that one mobile device is in a comparable location as another (e.g., locations are geographically similar or otherwise similar based on environmental location information), then the users of the respective devices may know each other or may otherwise have something in common (e.g., know the same people, be interested in the same things, etc.). Thus, 270 may include sending information associated with the devices. Such information may comprise, for example, an identification of the user of one of the devices or of interests of the users of the devices. In other embodiments, for example, 270 may be used to initiate or facilitate a P2P session and/or application or a M2M session and/or application. Thus, overall and in general, 270 may include any action to be taken based on whatever location information is determined or estimated.

Figure 3:
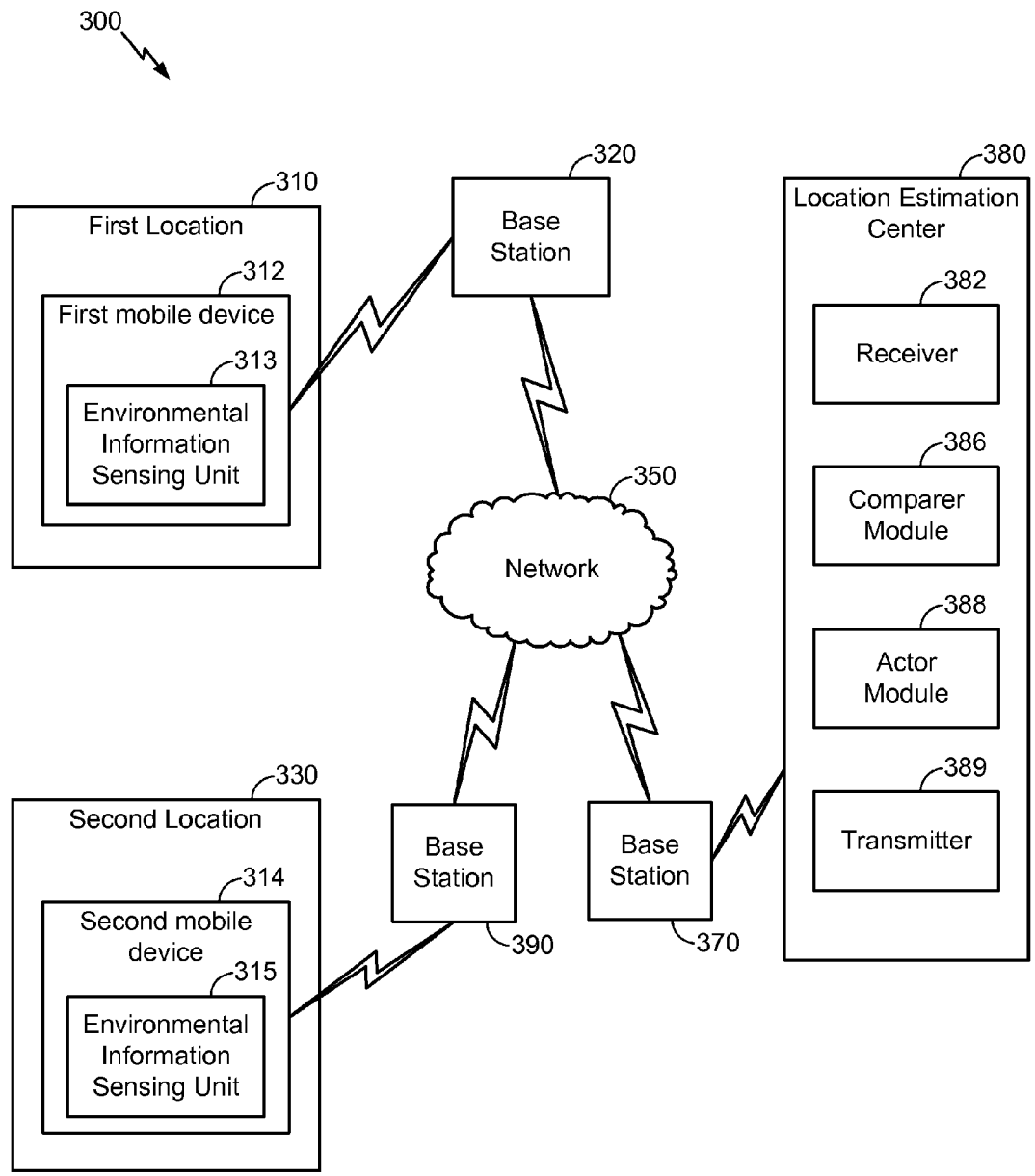
FIG. 3 is an illustration of another example environment for providing location estimation using environmental sound.

FIG. 3 is an illustration of another example environment 300 for providing location estimation using environmental sound and other environmental information. The environment 300 may include a first mobile device 312 to be located as well as a second mobile device 314. Each of the mobile devices 312, 314 may include one or more environmental information sensing units 313, 315. As discussed with respect to FIG. 1, such units 313, 315 may include, for example, one or more of microphones or other sound sensors, cameras, accelerometers or other motion sensors, color sensors, light sensors, thermometers, barometers, altimeters or other pressure sensors, or any other type of sensor such as any sensor used to measure, record, or otherwise convey any aspect of the environment of the respective devices 312, 314. Such units 313, 315 may comprise or use software and/or hardware added to one or more of the devices 312, 314 that may not be necessary for the typical operation. On the other hand, implementations may use sensors already incorporated into the devices 312, 314 such as, for example, microphones. Thus, implementations may be practiced without requiring any modification of mobile devices 312, 314.

Each of the mobile devices 312, 314 may be operational in any type of network, including any combination of cellular networks, circuit switching networks, public switching networks, local area networks, wireless access networks, wide area networks, the Internet, and/or any packet switching networks, etc. The first mobile device 312 may be in a first location 310 and the second mobile device 314 may in a second location 340. Thus, the first and second mobile devices 312, 314 may be in geographically comparable or similar locations 310, 340 or in geographically incomparable or dissimilar locations 310, 340 but yet in locations that are otherwise comparable based on similarities in respective location environments.

Each of the mobile devices 312, 314 may use their environmental information sensing units 313, 315 to sense environmental information of the respective locations 310, 340. Thus, for example, a microphone included with the first and second mobile devices 312, 314 may sense the same or similar environmental sound information emanating within the first and second locations 310, 340.

The mobile device 312 may be in communication with a base station 320. The base station 320 may communicate with a network 350 which may generally include any other portions of cellular, packet switching, circuit switching, PSTN, etc., networks used to enable the first mobile device 312 to communicate with other mobile or fixed devices, computers, servers, etc., located anywhere. The network 350, for example, may then communicate with a base station 370 that may be in communication with a location estimation center 380. The location estimation center 380 may be a node on a wired or wireless portion of the network 350, such as a server or client on the Internet.

The second mobile device 314 may communicate with the network 350 through base station 390. Thus, through the network 350, the second mobile device 314 may be in communication with the location estimation center 380. Even though the second mobile device 314 communicates with base station 390 instead of base station 320, it may still be in a similar geographic location as that of the first mobile device 312, depending on invention implementation.

The location estimation center 380 may be any entity within or outside of network 350 that estimates the location of devices, such as the mobile devices 312, 314 by comparing at least the environmental information received from the devices 312, 314. The location estimation center 380 may include one or more receivers, such as the receiver 382 for receiving environmental information from the mobile devices 312, 314. The receiver may be adapted to receive radio-frequency information or may be any other device or technology that obtains environmental information sent by the mobile devices 312, 314.

The location estimation center 380 may also include a comparer module 386. The comparer module 386 may compare environmental information received from the first mobile device 312 with environmental information received from the second mobile device 314. In this way, the comparer module 386 may determine that the first and second mobile devices 312, 314 are in either or both geographically comparable and/or environmentally comparable locations. The comparer module 386 thus may determine that the first and second mobile devices 312, 314 are in comparable locations.

The location estimation center may include an actor module 388. The actor module 388 may determine an action to be taken upon estimating a location of a mobile device, such as the mobile devices 312, 314. The actor module 388 may respond to any entity requesting location information and may provide any requested location information. In another implementation, the actor module 388 may, upon determining the location of the first mobile device 312, for example, send the first mobile device 312 an advertisement, message, or data associated with the first location 310. In alternative embodiments, the actor module 388 may send the first and second mobile devices 312, 314 information attempting to dissuade one or more users of the devices 312, 314 from remaining at the first or second locations 310, 340.

In alternative embodiments, the actor module 388 may receive data from one or more devices 312, 314. Such data may include a message, data, or communication to be sent to another one of the mobile devices 312, 314 or may be for sending to another device, server, or entity.

In still further embodiments, for example, the actor module 388 may be used to enhance social networking. For example, if the comparer module 386 estimates that the mobile devices 312, 314 are in comparable locations (e.g., locations that are geographically similar or otherwise similar based on environmental location information), then the actor module 388 may determine, based on reference to social networking information, that the users of the mobile devices 312, 314 may know each other or may otherwise have something in common (e.g., know the same people, be interested in the same things, etc.). The actor module 388 may send information associated with one of the mobile devices 312, 314 to one of the other devices 312, 314. Such information may be, for example, an identification of the user of the devices 312, 314 or an identification of interests of the users of the devices 312, 314. Thus, the actor module 388 may be an entity that determines any action to be taken based on whatever information is determined or estimated by the comparer module 386. In other embodiments, the actor module 388 or one of the client devices 312, 314, upon learning that they are within a comparable location of one another may initiate or facilitate a P2P session and/or application or a M2M session and/or application.

The location estimation center 380 may further include a transmitter 389 that sends any action determined by the actor module 388 to the intended recipient of the action.

A difference between the environment 100 of FIG. 1 and the environment 300 of FIG. 3 may be that, unlike the location estimation center 180 of FIG. 1, the location estimation center 380 of FIG. 3 may not include an environmental information database such as the environmental information database 184 shown in FIG. 1. In the embodiment of FIG. 3, the first location 310 of the first mobile device 312 is determined relative to the second location 340 of the second mobile device 314 based on environmental information associated with the devices 312, 314. Such information may be compared with each other to determine whether the two devices 312, 314 are in comparable geographic or environmental locations without reference to an environmental information database such as the database 184 of FIG. 1.

In an embodiment, the location estimation center 380 may receive geographic information from, for example, the second mobile device 314 that indicates the geographic location of the second mobile device 314. Such information may be, for example, the latitude and longitude of the second mobile device 314 determined using location techniques such as GPS, TDOA, observed time difference, cell identification, angle of arrival, etc. Alternatively or additionally, such geographic information may be related to a mailing address of the second location 340. The mailing address may specify the information to be used, for example, to mail a letter to the second location 340. Or the information may include only part of the mailing address. For example, the geographic location information may specify the name of an establishment (store, restaurant, stadium, etc.) within a city, town, part of a town, mall, etc. Regardless, such information may provide the location estimation center with information to aid in determining the geographic location of the second location 340 of the second mobile device 314.

In still further embodiments, the location information may be information received from or associated with an antenna in a cellular network. For example, the information may include information related to the geographic, network, or logical location of the cellular antenna and/or the cell within which it is located. Or the information may relate to, for example, the timing of signals received from the mobile devices 312, 314 at the antenna. And in other embodiments, the mobile devices 312, 314 may be within a wireless network (e.g., a WiFi network) and may relate to, for example, information regarding the identity and/or geographic, network, or logical location of that wireless network or the identity and/or location of one or more access points, routers, receivers, transmitters, gateways, etc., within that network. This fingerprint information may be used to help locate the mobile devices 312, 314.

In this way, when environmental information from the first and second devices 312, 314 enables the location estimation center 380 to estimate that the first and second devices 312, 314 are in comparable locations, the geographic information associated with the second mobile device 314 may provide the geographic location of the first mobile device 312 in the first location 310. Alternatively, finding sufficient similarity between the environmental information of the first and second devices 312, 314, along with the geographic information of the second location 340 of the second mobile device 314 may enable the location estimation center 380 to determine that the first location 310 of the first mobile device 312 is a particular type of entity associated with the entity at the second location 340.

For example, the location estimation center 380 may determine, from geographic information received from the second mobile device 314, that the second location is a store in a franchise, a retailer, or a particular type of entity (e.g., movie theater, diner, etc.). Thus, through determining that the first and second locations 310, 340 are comparable, the location estimation center may determine that the first location 310 is likewise a store in the franchise or the particular retailer or type of entity, even though the location estimation center 380 may not estimate the geographic location of the first mobile device 312.

Further, the first mobile device 312, along with providing environmental information, may likewise provide information associated with the geographic location of the first mobile device. Such information may comprise, for example, the latitude and longitude of the first mobile device 312 gleaned from location techniques such as GPS, TDOA, observed time difference, cell identification, angle of arrival, etc. Alternatively or additionally, such geographic information may be related to a mailing address of the first location 310, or may include only part of the mailing address. Or the information may relate to an antenna in a cellular network or to a wireless network fingerprint, as described herein. Such information may provide the location estimation center with information to aid in determining the geographic location of the first location 310 of the first mobile device 312.

Using this information, the location estimation center 380 and, in particular in some embodiments, the comparer module 386, may have an estimate of a geographic location of the first mobile device 312. But this information may not be enough to pin-point or accurately estimate (within parameters established in a particular implementation), the location of the device with the desired accuracy. For example, the geographic information may allow the location estimation center 380 to estimate the location of the first mobile device 312 within a shopping mall, but this information may not be enough to locate the device 312 within the mall. Thus, environmental information from the first mobile device 312 may further aid in locating the first mobile device 312 within a particular store within the mall.

Of course, the use of geographic information such as a latitude and longitude provided through use of GPS, TDOA, etc., or such as a mailing address or part of a mailing address, or from an antenna or wireless network, may be used in any implementation of the invention, including the implementations described above with respect to FIGS. 1 and 2.

Figure 4:
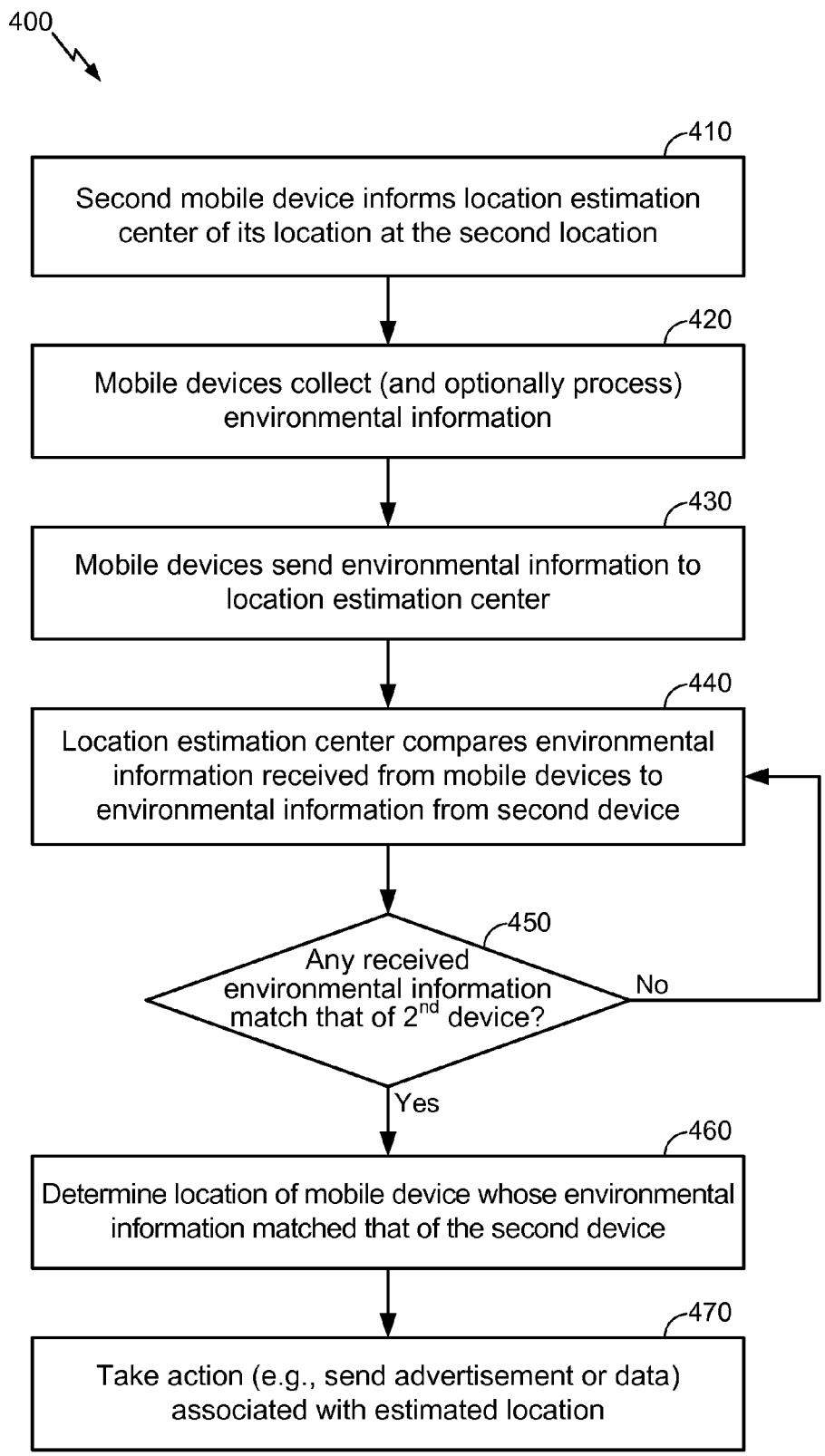
FIG. 4 is an operational flow of another implementation of a method for providing location estimation using environmental sound.

FIG. 4 is an operational flow of an implementation of a method 400 for providing location estimation using environmental location information such as environmental sound information. The method 400 may commence at 410, for example, when one of the mobile devices, such as the second mobile device 314 of FIG. 3, informs a location estimation center such as the location estimation center 380 of FIG. 3 of its geographic location. Such geographic location may be conveyed as a latitude and longitude or otherwise be information estimated through use of GPS, TDOA, or any other method. Alternatively, the geographic location information may be a mailing address or a part of a mailing address, or information related to a cell antenna or wireless network fingerprint. At 420, the mobile devices may collect environmental information associated with their respective locations. In an implementation, the mobile devices may process the collected environmental information. The mobile devices, at 430, may send the respective environmental information (either as raw collected data or data that has been processed by the mobile device) to the location estimation center.

The location estimation center, at 440, may compare environmental information received from mobile devices such as devices 312, 314 of FIG. 3. If, at 450, the location estimation center determines that the received environmental information from two or more mobile devices is comparable enough, depending again on the implementation of the invention, to be considered a location match, then at 460, the location of a mobile device such as the first mobile device 312 of FIG. 3, may be estimated or otherwise determined. If, at 450, no two sets of received environmental information from the mobile devices are found to be similar enough to be considered a match, then the location estimation center continues to compare environmental information received from the mobile devices in search of a match. With reference again to 450, a match in environmental information rests on the level of comparability or similarity used in the implementation. Thus a match in one implementation may be different from a match in another.

After 460 estimates a comparable location, then at 470, an action may be taken that is associated with the estimated location. For example, a response may be sent to any entity requesting location information and may provide any requested location information. In another implementation, 470 may include, upon determining the location of a mobile device, for example, sending an advertisement, message, or data associated with the estimated location. Such advertisement, message, or data may be intended to entice the user of the mobile device to become a patron of a store at or near the location. Or such an advertisement, message, or data may, in alternative embodiments, be intended to entice a user of the mobile device to leave the location and become a patron of a competitor to an entity at the location. In alternative embodiments, 470 may be sending to the located mobile device information that may tend to dissuade the user of the device from remaining at the location for any reason.

In alternative embodiments, 470 may include receiving data from one or more devices. Such data may include a message, data, or communication to be sent to another one of the mobile devices or may be for sending to another device, server, or entity. Thus, 470 may include sending a transmission as requested.

In still further embodiments, for example, 470 may be used to enhance social networking. For example, if the implementation results in an estimate that one mobile device is in a comparable location as another (e.g., locations are geographically similar or otherwise similar based on environmental location information), then the users of the respective devices may know each other or may otherwise have something in common (e.g., know the same people, be interested in the same things, etc.). Thus, 470 may include sending information associated with the devices, such as an identification of the user of one of the devices or of interests of the users of the devices. Thus, overall and in general, 470 may include any action to be taken based on whatever location information is determined or estimated. In other embodiments, upon learning that the mobile devices are within a comparable location of one another, P2P session and/or application or a M2M session and/or application may be initiated or facilitated.

Figure 5:
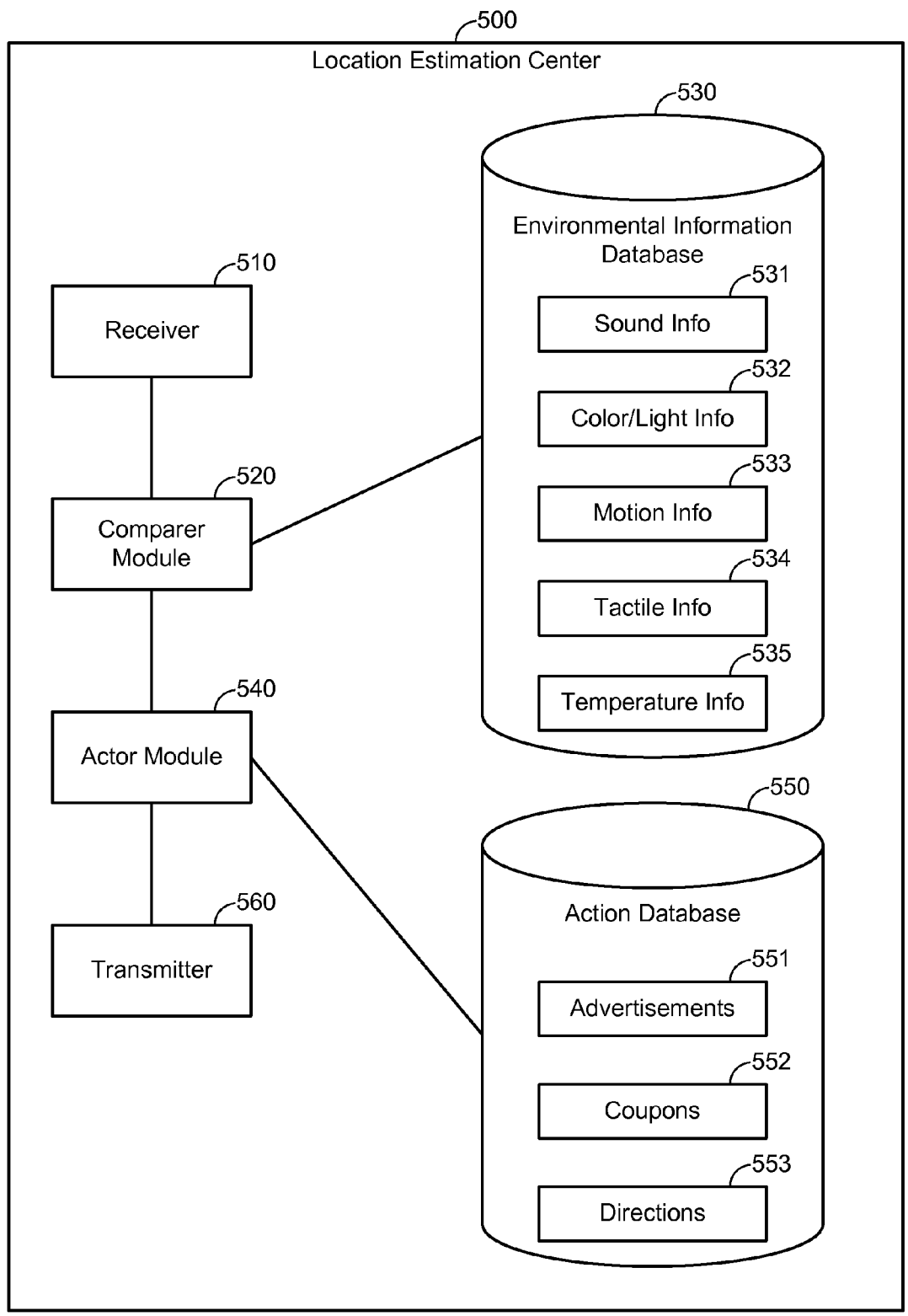
FIG. 5 is a diagram of an example location estimation center.

FIG. 5 is a diagram of an example location estimation center 500. The location estimation center 500 may include one or more receivers, such as the receiver 510 for receiving environmental information from the mobile devices. The receiver may be adapted to receive radio-frequency information or may be any other device or technology that obtains environmental information sent by the mobile devices.

The location estimation center 500 may include an environmental information database 530. The environmental information database 530 may include environmental information associated with prospective device locations. Thus, the database 530 may include one or more of sound information 531, color/light information 532, motion information 533, including data collected from an accelerometer, tactile information 534 related to any surfaces, for example, upon which a mobile device may be placed, and temperature information 535. Of course, the information in the environmental information database 530 can include other types of information such as, for example, barometric pressure, etc. The contents of the environmental information database 530 thus are implementation specific. The environmental information database 530 may be populated with such environmental information by "fingerprinting" the locations through any method prior to performing any location estimations according to the invention. On the other hand, the database may be populated on the fly by receiving environmental information from devices simultaneously or almost simultaneously with location estimations or determinations.

The location estimation center 530 may also include a comparer module 520. The comparer module 520 may retrieve information from the environmental information database 530 and perform comparison operations, for example, to determine if environmental information perceived by a mobile device is similar to the environmental information stored in the environmental information database 520. The extent of the required comparability, of course, depends on the implementation. However, when a similarity is determined, then the location associated with the environmental information stored in the database may be estimated to be comparable to the location of the mobile device.

Alternatively or additionally, the comparer module 520 may compare environmental information received from one mobile device with environmental information received from, for example, another mobile device. In an alternative embodiment, the comparer module 520 may determine whether any of the environmental information received from the mobile devices is comparable or similar within the implementation parameters. Thus, the comparer module 520 may determine that the mobile devices are in a comparable location. Further, the comparer module 520 may refer to the information stored in the environmental information database 530 and determine that the mobile devices are in a particular geographic location or otherwise in a particular comparable location (e.g., same type of store). For example, the comparer module 520 may determine the geographic location of the mobile devices by reference to the environmental information database 530. The comparer module 520 further may determine that the mobile devices are in a comparable location. Thus, while a location of a mobile device may be determined to be, in an implementation, geographically dissimilar to a location of another mobile device, the locations may be determined to be comparable to each other based on environmental information provided by the mobile devices (or retrieved from the environmental information database 530).

The location estimation center 500 may include an actor module 540. The actor module 540 may decide an action to be taken upon estimating a location of a mobile device. The actor module 540 may make such a decision by accessing data stored in an action database 550. The database 550 may store, for example, information related to advertisements, messages, or other data 551 to be sent to a mobile device determined or estimated to be in a particular comparable location. The database may also include coupons 552 likewise to be sent to the mobile device to entice the user of the device to enter a particular establishment, etc. The database 550 may also include directions 553 to aid the user of the mobile device to find, for example, a competitor of the entity at the estimated location. Of course, the action database 550 may include any information necessary, useful, or desired to enable the actor module 540 to send appropriate information to a mobile device whose location has been estimated or determined.

Thus, the actor module 540 may respond to any entity requesting location information and provide any requested location information. The actor module 540 may, upon determining the location of a mobile device, send the device an advertisement, message, data, coupons, directions, or other information associated with the device's location.

In still further embodiments, for example, the actor module 540 may be used to enhance social networking. For example, if the comparer module 520 estimates that a mobile device is in a comparable location as another mobile device, then the actor module 540 may determine, based on reference to social networking information, that the users of mobile devices may know each other or may otherwise have something in common, and may send information associated with one of the mobile devices to the other. The location estimation center 500 may further include a transmitter 560 that is responsible for sending any action determined by the actor module 540 to the intended recipient of the action. In other embodiments, the actor module 540 may initiate or facilitate a P2P session and/or application or a M2M session and/or application between mobile devices determined to be in comparably located.

Figure 6:
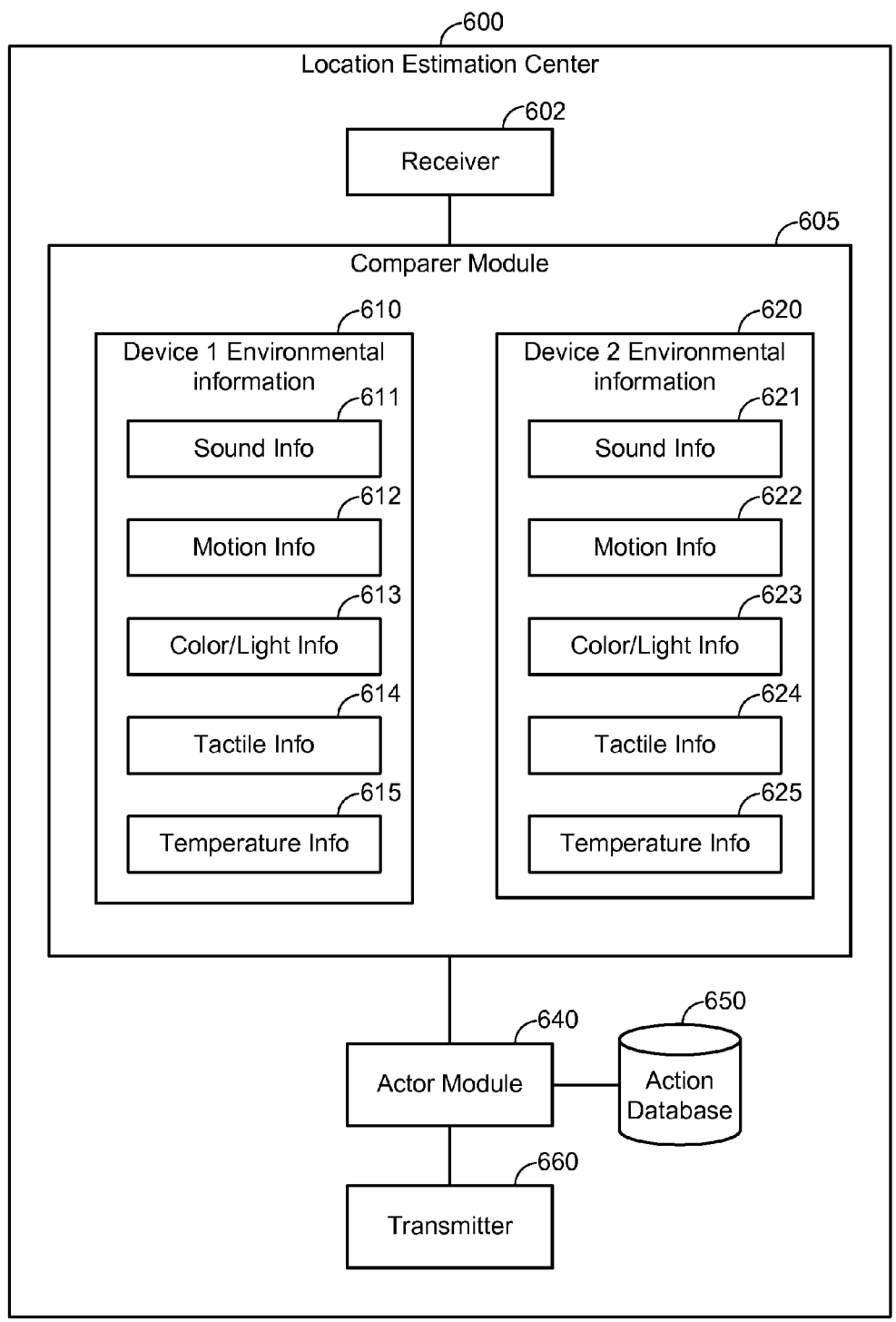
FIG. 6 is a diagram of another example location estimation center.

FIG. 6 is a diagram of another example location estimation center 600. The location estimation center 600 may include one or more receivers, such as a receiver 602 for receiving environmental information from the mobile devices. The receiver may be adapted to receive radio-frequency information or may be any other device or technology that first obtains environmental information send by the mobile devices.

The location estimation center 600 may also include a comparer module 605. The comparer module 605 may compare environmental information received from one mobile device with environmental information received from, for example, another mobile device. Thus, as depicted, the comparer module 605 may receive from a first device certain environmental information 610 including, for example, sound information 611, motion information 612 (e.g., provided by an accelerometer and the like), color/light information 613 (provided, for example, by a camera on the first device), tactile information 614, and temperature information 615.

Further, the comparer module 605 may compare the environmental information 610 from the first device with environmental information 620 received from a second device. Such information may include, again for example purposes only, sound information 621, motion information 622 (e.g., provided by an accelerometer and the like), color/light information 623 (provided, for example, by a camera on the first device), tactile information 624, and temperature information 625. In this alternative embodiment, the comparer module 605 may determine whether any of the environmental information received from the mobile devices is similar within the implementation parameters. Thus, the comparer module 605 may determine that the mobile devices are in a comparable location without reference to any environmental information database such as the database 530 shown in FIG. 5.

The location estimation center 600 may include an actor module 640. The actor module 640 may, as described above determine an action to be taken upon estimating a location of a mobile device. The actor module 640 may make such decision by accessing data stored in an action database 650, similar to the action database 550 described with respect to FIG. 5. The location estimation center 600 may further include a transmitter 660 that sends any action determined by the actor module 640 to the intended recipient of the action.

Figure 7:
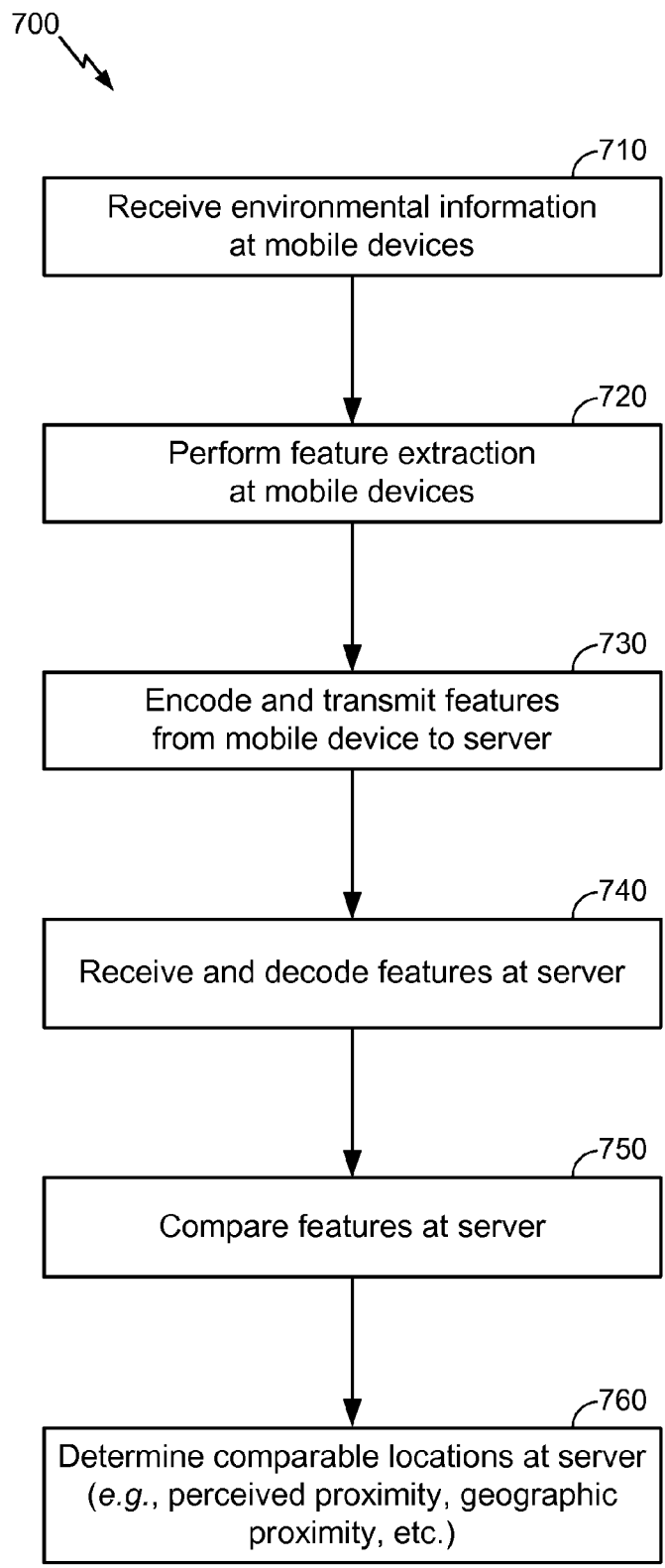
FIG. 7 is an operational flow of an implementation of a method for providing location estimation using environmental sound.

FIG. 7 is an operational flow of an implementation of a method 700 for providing location estimation using environmental sound. The method 700 may be performed at, for example, a location estimation center 180, 380, 500, 600 described above, or at or within any computer, server, client, etc. In an implementation, the method may commence at 710 by receiving environmental information at mobile devices. Such information may be sound information perceived by respective microphones of the devices or any other environmental information as described herein. In implementations, the computations for determining comparable locations of mobile devices may be robust to account for distortion and additive noise. Also, the computations may be performed with the same methodology even if the mobile devices are of different types, or their components (e.g., microphones, etc.) are different. To achieve this robustness, speech recognition features and audio fingerprint features may be used. After choosing proper features, comparable locations may be determined. As described herein, such locations may be comparable if the mobile devices perceive the same or similar environmental information (e.g., are perceptually close in terms of human perception, as a human would perceive the environmental information). In such circumstances, the devices may be within a perceptual distance or perceptual proximity of one another (e.g., in or near the same store, etc.) as described herein.

Next, at 720, feature extraction may be performed at the mobile devices that collected the environmental information. Such extraction may be performed on the environmental information collected at 710. The feature extraction may utilize microphone input, speech recognition, etc. The speech recognition feature may use any speech recognition methodology. For example, such methodology may include MFCC (Mel-frequency cepstral coefficients), LPC (linear predictive coding), and/or LSP (line spectrum pair), which are well-known methodologies for speech recognition or speech codec. Further, extracted features may include audio fingerprinting features using, for example purposes only, MFCC, band representative vectors, band energy differences, etc.

In one embodiment, extracted features may be transformed in order to achieve robustness to noise and distortion or reduce the size of the feature data. The transformation may include delta operation, binarization operation, bit stack operation, etc. The delta operation may include any operation that calculates the delta or difference of the features (e.g., X(t)−X(t−1), where t represents time). The binarization may return "1" if the delta operation results in a positive, and return "0" if the delta results in a negative. The bit stack operation may place the result of the binarization output into one variable. In one embodiment, the extracted features, for example, MFCC, may include thirteen dimensions, and each dimension is represented as a 16 bit short variable. Thus, the features may be 26 bytes. In other embodiments, the features may be binarized, thus, each dimension is represented as 1 bit binary variable. The binarized features may be 13 bits, and the mobile device may send 13 bits per 10 ms, which may correspond to 1.27 kilobits per second.

At 730, the extracted features may be transmitted from each of the mobile devices to a server so that, for example, sound and other environmental information may be compared. Prior to transmission, the extracted features may be encoded, depending on the implementation.

At 740, at the server, the features are received and decoded. At 750, at the server, a comparison of the features is performed to measure how the locations of mobile devices are comparable. Such measurement may be performed using a Euclidean distance or normalized cross correlation, for example. At 760, the server may use the results of the comparison to determine comparable locations (e.g., perceived proximity, geographic proximity, etc.).

The correlation coefficient calculation may be performed according to equation (1), though of course any appropriate method may also be used:

$$C[k] = \frac{\sum_n (X_1[n] - \mu_1) \cdot (X_2[n-k] - \mu_2)}{\sigma_1 \cdot \sigma_2}, \quad (1)$$

where $X_1[n]$ and $X_2[n]$ are extracted features from device 1 and device 2, respectively, at the time frame n, μ is a mean of X, and σ is a standard deviation of X. C[k] is a correlation coefficient between features from device 1 and device 2 with time delay of k frames. The result of the calculation regarding correlation coefficient may be graphically depicted. Such a graphical representation may be of correlation coefficient vs. time with respect to two environmental sound patterns. The depiction may demonstrate the comparison between the two environmental sound patterns.

Because the correlation coefficient computations may be relatively involved, a Euclidean distance may also be calculated in lieu of or in addition to the correlation coefficient calculation. Such a Euclidean distance may be calculated according to equation (2):

$$D[k] = \sum_n (X_1[n] - X_2[n-k])^2, \quad (2)$$

where D[k] is a Euclidean distance between features from device 1 and device 2 with time delay of k frames. The result of the calculation of Euclidean distance may be graphically depicted, as a graphical representation of Euclidean calculation vs. time with respect to two environmental sound patterns, for example. The depiction may demonstrate the comparison between the two environmental sound patterns.

At 760, a determination is performed to determine if locations of mobile devices are comparable. Thus, 760 involves determining if the locations are within a perceived proximity of one another (e.g., are perceptually close), are within a geographic location of one another, or are otherwise within a comparable location. In an embodiment, it may be determined within a comparable location if the normalized cross correlation C[k] is greater than a certain threshold or if the Euclidean distance D[k] is less than a certain threshold.

Additionally, implementations may address synchronization issues. One such issue may involve network time synchronization regarding the timing of data being sent from the mobile devices to the location estimation center. The actual time signals sent from one device in comparison to another device may be different. Thus, in embodiments, synchronization may be corrected by periodically exchanging network time information from the location estimation center. In other embodiments, and even if the devices are adequately synchronized, the two devices may be in comparable locations but may be separated from one another. This may cause a time delay between devices. For example, in some embodiments, if the distance between two devices is greater than 3.4 meters, the time delay may be longer than 10 ms, which may be one frame. In this case, the devices may be located in the same space but the correlation or Euclidean distance may be degraded.

In embodiments, and as discussed with respect to synchronization, when the correlation coefficients or Euclidean distance is calculated, the maximum or minimum values may be used to compensate for time delay. By taking maximum of correlation or minimum of distance, the effect of inter-device time delay and network time mismatch may be minimized or eliminated.

One method for compensating for inter-device time delay includes equation (3):

$$C_{max}[n] = \max_{k=n-N}^{n+N} C[k] \quad (3),$$

where $C_{max}[n]$ is the maximum correlation coefficient. Equation (4) may be used in conjunction with this maximum correlation coefficient calculation or independent of it:

$$D_{min}[n] = \min_{k=n-N}^{n+N} D[k] \quad (4),$$

where $D_{min}[n]$ is the minimum of Euclidean distance. It is noted that either C or D can be used as a criterion for measuring the similarity of sound. But correlation and distance are sensitive to time delay. By using $C_{max}$ or $D_{min}$, which is the maximum of C[k] or the minimum of D[k] within a block respectively, robustness to time delay may be achieved. In an embodiment, it may be determined within a comparable location if the maximum normalized cross correlation $C_{max}[n]$ is greater than a certain threshold or if the minimum Euclidean distance $D_{min}[n]$ is less than a certain threshold.

Figure 8:
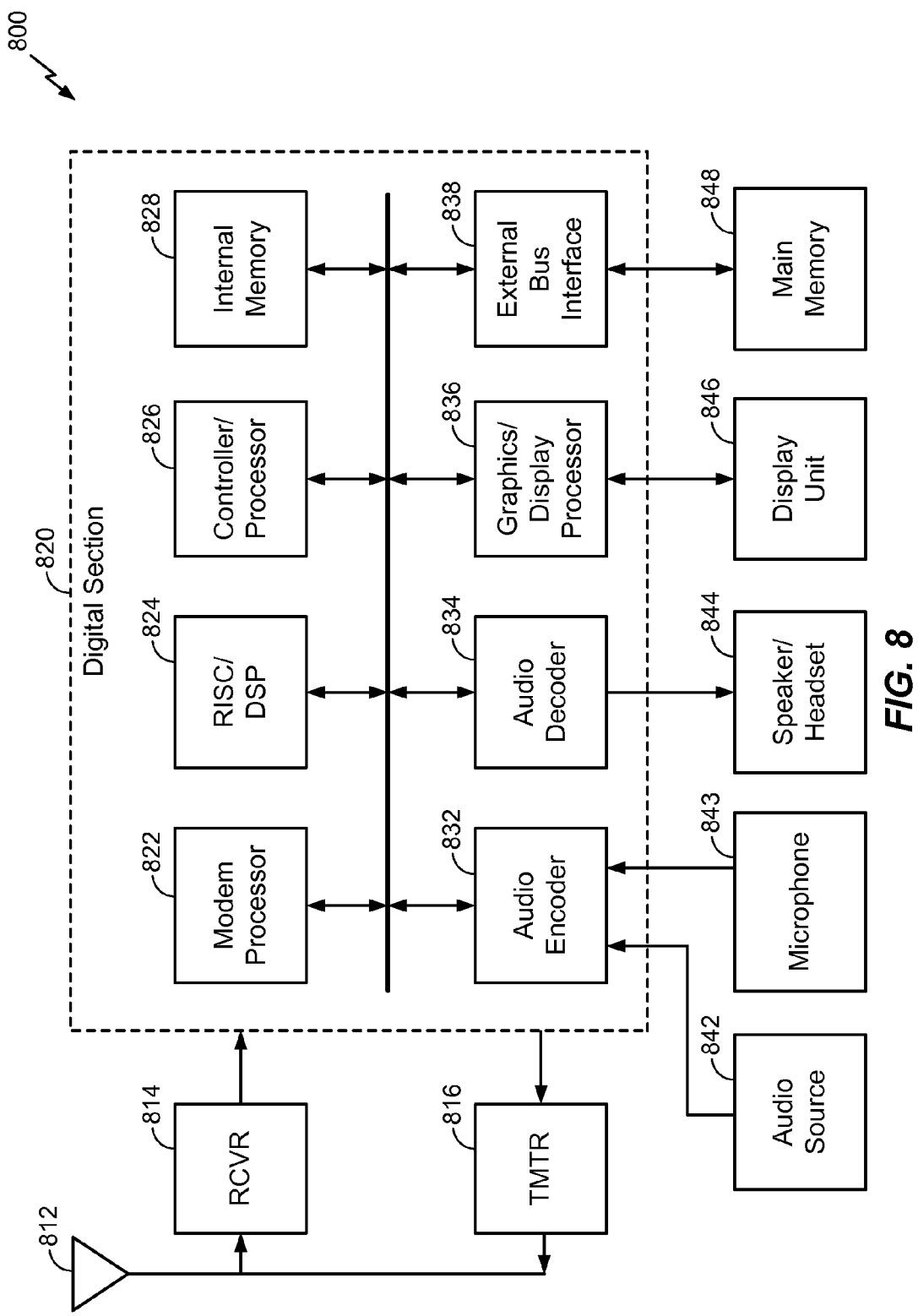
FIG. 8 is a diagram of an example mobile device.

FIG. 8 shows a block diagram of a design of an example mobile device 800 in a wireless communication system. Mobile device 800 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, etc. Mobile device 800 is capable of providing bidirectional communication via a receive path and a transmit path. On the receive path, signals transmitted by base stations are received by an antenna 812 and provided to a receiver (RCVR) 814. Receiver 814 conditions and digitizes the received signal and provides samples to a digital section 820 for further processing. On the transmit path, a transmitter (TMTR) 816 receives data to be transmitted from digital section 820, processes and conditions the data, and generates a modulated signal, which is transmitted via antenna 812 to the base stations. Receiver 814 and transmitter 816 may be part of a transceiver that may support CDMA, GSM, etc.

Digital section 820 includes various processing, interface, and memory units such as, for example, a modem processor 822, a reduced instruction set computer/digital signal processor (RISC/DSP) 824, a controller/processor 826, an internal memory 828, a generalized audio encoder 832, a generalized audio decoder 834, a graphics/display processor 836, and an external bus interface (EBI) 838. Modem processor 822 may perform processing for data transmission and reception, e.g., encoding, modulation, demodulation, and decoding. RISC/DSP 824 may perform general and specialized processing for wireless device 800. Controller/processor 826 may direct the operation of various processing and interface units within digital section 820. Internal memory 828 may store data and/or instructions for various units within digital section 820.

Generalized audio encoder 832 may perform encoding for input signals from an audio source 842, a microphone 843, etc. Generalized audio decoder 834 may perform decoding for coded audio data and may provide output signals to a speaker/headset 844. Graphics/display processor 836 may perform processing for graphics, videos, images, and texts, which may be presented to a display unit 846. EBI 838 may facilitate transfer of data between digital section 820 and a main memory 848. Digital section 820 may be implemented with one or more processors, DSPs, microprocessors, RISCs, etc. Digital section 820 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The location estimation techniques described herein may be implemented by various means. For example, these techniques may be implemented in hardware, firmware, software, or a combination thereof. Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer readable medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
   receiving, at a comparer module, first environmental information from a first device, wherein the first device is at a first location, and wherein the first environmental information includes first environmental sound information;
   receiving second environmental information from a second device, wherein the second device is at a second location, wherein the second environmental information includes second environmental sound information, and wherein the second location is remote from the first location;
   comparing the first environmental information with the second environmental information; and
   determining, based on the comparison, that a first environment of the first device is similar to a second environment of the second device.

2. The method of claim 1, further comprising:
   sending data to the first device in response to determining that the first environment is similar to the second environment.

3. The method of claim 2, further comprising:
   receiving the data from the second device before sending the data to the first device and in response to determining that the first environment is similar to the second environment.

4. The method of claim 1, further comprising:
   comparing the first environmental sound information with environmental sound data in an environmental sound database, wherein the environmental sound data is associated with a plurality of locations.

5. The method of claim 4, further comprising:
   determining a type of the first location based on the comparison of the first environmental sound information with the environmental sound data, wherein the type is at least one of a movie theatre, a diner, a store of a particular franchise, a store of a particular retailer, and a mall.

6. The method of claim 4, further comprising:
determining the first location based on the comparison of the first environmental sound information with the environmental sound data; and
sending data to the first device in response to determining the first location, wherein the data is at least one of a coupon associated with a store within geographical proximity of the first location, an advertisement associated with the store, an advertisement associated with a competitor of the store, and a coupon associated with the competitor.

7. The method of claim 1, further comprising:
receiving first location information associated with the first location.

8. The method of claim 7, wherein the first location information indicates a latitude and a longitude.

9. The method of claim 1, further comprising:
facilitating at least one of a peer-to-peer service application or a machine-to-machine service application with respect to at least one of the first device or the second device.

10. The method of claim 2, wherein the data includes at least one of an advertisement, a coupon, directions to a location, an identifier of a user of the second device, an identification of an interest of the user of the second device, an email, a text message, an instant message, a web chat, a facsimile, and a website.

11. The method of claim 2, wherein the data is associated with the second location.

12. The method of claim 2, wherein the data is associated with a competitor of a business located at the first location.

13. A method, comprising:
receiving, at a comparer module, environmental sound information from a device;
receiving, from the device, estimated location information associated with an estimated location of the device;
comparing the environmental sound information with environmental sound data retrieved from an environmental sound database, wherein the environmental sound data is associated with a plurality of locations within a geographical proximity of the estimated location; and
updating the estimated location of the device based on the comparison of the environmental sound information with the environmental sound data.

14. The method of claim 13, wherein the estimated location information indicates a range of locations at which the device may be located, and wherein updating the estimated location includes determining a location of the device within the range of locations.

15. The method of claim 14, wherein the range of locations corresponds to locations within a building, and wherein the location corresponds to a particular location within the building.

16. The method of claim 13, further comprising accessing the environmental sound database in response to receiving the estimated location information, wherein accessing the environmental sound database includes selecting the environmental sound data from the environmental sound database based on the estimated location information.

17. The method of claim 13, wherein the estimated location information includes global positioning system (GPS) information, and wherein the environmental database is dynamically populated by sound data from a plurality of devices within the geographical proximity.

18. An apparatus comprising:
means for receiving first environmental information from a first device, wherein the first device is at a first location, and wherein the first environmental information includes first environmental sound information;
means for receiving second environmental information from a second device, wherein the second device is at a second location, and wherein the second environmental information includes second environmental sound information;
means for comparing the first environmental information with the second environmental information;
means for determining, based on the comparison, that a first environment of the first device is similar to a second environment of the second device; and
means for sending data to the first device in response to determining that the first environment is similar to the second environment, wherein the data includes at least one of an advertisement, a coupon, directions to a location, and an identification of an interest of a user of the second device.

19. The apparatus of claim 18, further comprising:
means for receiving the data from the second device before sending the data to the first device and in response to determining that the first environment is similar to the second environment.

20. The apparatus of claim 18, wherein the means for determining that the first environment is similar to the second environment based on the comparison comprises means for generating a value based on the comparison and means for determining that the value satisfies a threshold.

21. The apparatus of claim 18, further comprising:
means for comparing the first environmental sound information with environmental sound data in an environmental sound database, wherein the environmental sound data is associated with a plurality of locations; and
means for determining a type of the first location based on the comparison of the first environmental sound information with the environmental sound data, wherein the type is at least one of a movie theatre, a diner, a store of a particular franchise, a store of a particular retailer, and a mall.

22. The apparatus of claim 18, wherein the data is associated with at least one of the first location or the second location.

23. The apparatus of claim 18, wherein the data further comprises client message data.

24. The apparatus of claim 18, further comprising:
means for receiving second location information associated with the second location.

25. The apparatus of claim 24, wherein the second location information includes at least a portion of a mailing address.

26. The apparatus of claim 24, wherein the second location information is based, at least in part, on a Global Positioning System (GPS).

27. The apparatus of claim 24, wherein the second location information is based, at least in part, on information received by an antenna in a cellular system.

28. The apparatus of claim 18, wherein the first location and the second location are geographically similar.

29. The apparatus of claim 18, wherein the first location and the second location are geographically different.

30. The apparatus of claim 18, further comprising:
means for facilitating at least one of a peer-to-peer service application or a machine-to-machine service application with respect to at least one of the first device or the second device.

31. A non-transitory computer-readable medium comprising instructions that, when executed by a processor, cause the processor to:
receive first environmental information from a first device, wherein the first device is at a first location, and wherein the first environmental information includes first environmental sound information;
receive second environmental information from a second device, wherein the second device is at a second location, and wherein the second environmental information includes second environmental sound information, and wherein the second location is remote from the first location;
compare the first environmental sound information with the second environmental sound information; and
determine, based on the comparison, that a first environment of the first device is similar to a second environment of the second device.

32. The non-transitory computer-readable medium of claim 31, further comprising instructions executable by the processor to send data to the first device in response to determining that the first environment is similar to the second environment, wherein the data includes at least one of an advertisement, a coupon, directions to a location, an identifier of a user of the second device, an identification of an interest of the user of the second device, an email, a text message, an instant message, a web chat, a facsimile, and a website.

33. The non-transitory computer-readable medium of claim 32, further comprising receiving the data from the second device before sending the data to the first device and in response to determining that the first environment is similar to the second environment.

34. The non-transitory computer-readable medium of claim 32, wherein the data further comprises client message data.

35. The non-transitory computer-readable medium of claim 32, wherein the data is associated with at least one of the first location or the second location.

36. The non-transitory computer-readable medium of claim 31, further comprising instructions executable by the processor to receive second location information associated with the second location.

37. The non-transitory computer-readable medium of claim 36, wherein the second location information indicates a latitude and a longitude.

38. The non-transitory computer-readable medium of claim 36, wherein the second location information is based, at least in part, on information received by an antenna in a cellular system.

39. The non-transitory computer-readable medium of claim 36, wherein the second location information is based, at least in part, on a Global Positioning System (GPS).

40. The non-transitory computer-readable medium of claim 31, further comprising instructions executable by the processor to receive first location information associated with the first location.

41. An apparatus comprising:
a receiver configured to:
receive first environmental information from a first device, wherein the first device is located at a first location, and wherein the first environmental information includes first environmental sound information; and
receive second environmental information from a second device, wherein the second device is located at a second location, wherein the second environmental information includes second environmental sound information, and wherein the second location is remote from the first location; and
a first module in communication with the receiver and configured to:
compare the first environmental information with the second environmental information; and
determine, based on the comparison, that a first environment of the first device is similar to a second environment of the second device.

42. The apparatus of claim 41, further comprising:
a second module in communication with the first module and configured to determine an action to be performed in response to determining that the first environment is similar to the second environment.

43. The apparatus of claim 42, wherein the action comprises sending data to the first device.

44. The apparatus of claim 43, wherein the data comprises at least one of an advertisement or client message data.

45. The apparatus of claim 43, wherein the data is associated with at least one of the first location or the second location.

46. The apparatus of claim 42, further comprising:
an action database accessible by the second module and indicating selectable actions to be performed in response to determining that the first environment is similar to the second environment.

47. The apparatus of claim 41, further comprising:
an environmental sound database accessible by the first module and comprising environmental sound data associated with the first and second locations.

48. The apparatus of claim 41, wherein the first module receives first location information associated with the first location.

* * * * *